United States Patent [19]
Jones et al.

[11] Patent Number: 5,689,165
[45] Date of Patent: Nov. 18, 1997

[54] ESTIMATOR INITIALIZATION CIRCUIT AND METHOD FOR A SENSORLESS SWITCHED RELUCTANCE MACHINE SYSTEM

[75] Inventors: Stephen R. Jones, Winnebago; Barry T. Drager, Rockford, both of Ill.

[73] Assignee: Sundstrand Corporation, Rockford, Ill.

[21] Appl. No.: 629,698

[22] Filed: Apr. 9, 1996

[51] Int. Cl.$^6$ .................................................. H02P 7/00
[52] U.S. Cl. .................................. 318/701; 318/254
[58] Field of Search ............................ 318/254, 439, 318/138, 701

[56] References Cited

U.S. PATENT DOCUMENTS

| | | | |
|---|---|---|---|
| 4,611,157 | 9/1986 | Miller et al. | 318/696 |
| 4,642,543 | 2/1987 | MacMinn | 318/696 |
| 4,772,839 | 9/1988 | MacMinn et al. | 318/696 |
| 4,959,596 | 9/1990 | MacMinn et al. | 318/254 |
| 5,097,190 | 3/1992 | Lyons et al. | 318/701 |
| 5,107,195 | 4/1992 | Lyons et al. | 318/701 |
| 5,140,244 | 8/1992 | Lyons et al. | 318/701 |
| 5,448,149 | 9/1995 | Ehsani et al. | 318/701 |
| 5,467,025 | 11/1995 | Ray | 318/701 X |

OTHER PUBLICATIONS

*Design and Implementation of a Five Horsepower, Switched Reluctance, Fuel-Lube, Pump Motor Drive for a Gas Turbine Engine* written by Caio A. Ferreira, Stephen R. Jones, Barry T. Drager and William S. Heglund, IEEE Ninth Annual Applied Power Electronics Conference and Exposition, Feb. 13–17, 1994.

*Practical Indirect Position Sensing for a Variable Reluctance Motor* written by Walter D. Harris and submitted to the Massachusetts Institute of Technology, May 1987.

*A Simple Motion Estimator for Variable–Reluctance Motors*, written by Walter D. Harris and Jeffrey H. Lang, published in IEEE, vol. 26, No. 2, Mar./Apr. 1990.

*Low Cost Sensorless Switched Reluctance Motor Drives For Automotive Applications* written by M. Ehsani and I. Husain, (members IEEE) Power Electronics Laboratory, Dept. Of Electrical Engineering, Texas A&M University, College Station, TX. pp. 96–101.

*Applications of Sensor Integration Techniques to Switched Reluctance Motor Drives* written by Stephen R. MacMinn, William J. Rzesos, Paul M. Szczesny and Thomas M. Jahns, published in IEEE vol. 28, No. 6, Nov./Dec. 1992.

*An Analysis of the Error in Indirect Rotor Position Sensing of Switched Reluctance Motors* written by M. Ehsani, I. Husain and K.R. Ramani, Department of Electrical Engineering, Texas A&M University, College Station, Texas.

*New Modulation Encoding Techniques for Indirect Rotor Position Sensing in Switched Relectance Motors*, written by Mehrdad Ehsani, Iqbal Husain, S. Mahajan, and K.R. Ramani, published in IEEE, vol. 30, No. 1, Jan./Feb. 1994.

*Flux/Current Methods for SRM Rotor Position Estimation*, written by J.P. Lyons, S.R. MacMinn and M.A. Preston, published in May 1991 IEEE.

Primary Examiner—Jonathan Wysocki
Attorney, Agent, or Firm—Marshall, O'Toole, Gerste Murray & Borun

[57] ABSTRACT

An estimator initialization circuit for a sensorless switched reluctance machine system pulses phase windings of the machine a certain number of times and derives initial values for an estimator of the system.

16 Claims, 7 Drawing Sheets

ESTIMATOR INITIALIZATION CIRCUIT AND METHOD FOR A SENSORLESS SWITCHED RELUCTANCE MACHINE SYSTEM

BACKGROUND AND SUMMARY OF INVENTION

The present invention relates generally to motors/generators and, more particularly, to high speed switched reluctance machines capable of starting a prime mover as well as generating electrical power for use on aircraft.

The aerospace industry has consistently driven the leading edge of technology with the requirement for lightweight, high efficiency, high reliability equipment. The equipment must be lightweight because each additional pound of weight translates directly into increased fuel burn, and therefore, a higher cost of ownership and shorter range. The need for high efficiency results from the fact that each additional cubic inch required for equipment displaces the amount of revenue-generating cargo and passengers that can be carried on an aircraft. High reliability is important because every minute of delay at the gate increases the cost of ownership, and likewise, increases passenger frustration.

For aircraft electric power generation systems, these pressures have precipitated great advancements in technology, but have also caused problems. Aircraft have typically used synchronous brushless AC generators or permanent magnet generators for electric power generation needs. Unfortunately, both of these types of generators require components which can fail due to the conditions under which they are required to operate (usually mounted directly on the aircraft jet engine).

In addition to an electrical generator, an engine starter is also typically installed on the aircraft engine. This component is used only during starting, which occupies only a very small fraction of each operational cycle of the aircraft. In effect, the starter becomes excess baggage during the remainder of the flight, increasing overall weight, fuel burn, and cost of ownership, and decreasing overall range. This problem has been recognized and efforts have been expended to combine the starter and generator into a single package, thus eliminating the need for an additional piece of equipment used only a fraction of the time. Unfortunately, using synchronous AC or permanent magnet generators for this purpose, in addition to crating new problems associated with the start function, does not eliminate the inherent problems with these machines as described above.

As an alternative to the use of the synchronous AC or the permanent magnet generator for this combined starter/generator function, a switched reluctance machine can be used. A switched reluctance machine is an inherently low cost machine, having a simple construction which is capable of very high speed operation, thus yielding a more lightweight design. The rotor of the switched reluctance machine is constructed from a simple stack of laminations making it very rugged and low cost without the containment problems associated with rotor windings or permanent magnets. Further, the rotor does not require rotating rectifiers, which contribute to failures, as does the AC synchronous machine.

In order to properly operate a switched reluctance machine, it has been found necessary in the past to determine the rotor position in order to properly commutate the currents flowing in the phase windings of the machine. Resolvers are used, particularly in high speed systems, or sometimes encoders in low speed systems, to obtain a measure of rotor position. However, resolvers and required associated apparatus (chiefly, a resolve-to-digital converter and an excitation circuit) are expensive and both resolvers and encoders are a source of single point failure.

In order to obviate the need for position sensors, such as resolvers or encoders, sensorless operational techniques have been developed. The most trivial solution to sensorless operation is to control the switched reluctance machine as a stepper motor in the fashion disclosed in Bass, et al. U.S. Pat. No. 4,611,157 and MacMinn U.S. Pat. No. 4,642,543.

In an alternative technique, machine inductance or reluctance is detected and utilized to estimate rotor position. Specifically, because the phase inductance of a switched reluctance machine varies as a function of angle from alignment of the stator pole for that phase and a rotor pole, a measurement of instantaneous phase inductance can be utilized to derive an estimate of rotor position. See MacMinn, et al. U.S. Pat. No. 4,772,839, MacMinn, et al. U.S. Pat. No. 4,959,596, Harris "Practical Indirect Position Sensing for a Variable Reluctance Motor," Masters of Science Thesis, MIT, May 1987, Harris, et al. "A Simple Motion Estimator for Variable Reluctance Motors," IEEE Transactions on Industrial Applications, Vol 26, No. 2, March/April, 1990, and MacMinn, et al. "Application of Sensor Integration Techniques to Switched Reluctance Motor Drives," IEEE Transactions on Industry Applications, Vol. 18, No. 6, November/December 1992.

In a further technique, phase inductance can be determined using a frequency modulation approach whereby a non-torque producing phase forms part of a frequency modulation encoder. See Ehsani, et al. "Low Cost Sensorless Switched Reluctance Motor Drives for Automotive Applications," Texas A&M Power Electronics Laboratory Report (date unknown), Ehsani, et al. "An Analysis of the Error in Indirect Rotor Position Sensing of Switched Reluctance Motors," IEEE Proceedings IECON '91, Ehsani "A Comparative Analysis of SRM Discrete Shaft Position Sensor Elimination by FM Encoder and Pulsed Impedance Sensing Schemes," Texas A&M Power Electronics Laboratory Report, (date unknown) and Ehsani, et al. "New Modulation Encoding Techniques for Indirect Rotor Position Sensing in Switched Reluctance Motors," IEEE Transactions on Industry Applications, Vol. 30, No. 1, January/February, 1994.

A model-based approach to rotor position estimation has been developed by General Electric Company and is disclosed in Lyons, et al. "Flux/Current Methods for SRM Rotor Position Estimation," Proceedings of IEEE Industry Applications Society Annual Meeting, Vol. 1, 1991, and Lyons, et al. U.S. Pat. No. 5,097,190. In this technique, a multi-phase lumped parameter model of the switched reluctance machine is developed and utilized. However, the model has been developed only for a three-phase machine wound in a north-south-north-south-north-south configuration.

A position estimation subsystem has been developed by the assignee of the instant application and includes a relative angle estimation circuit, an angle combination circuit and an estimator including a Kalman filter. The relative angle estimation logic is responsive to the phase current magnitudes of the switched reluctance machine and develops an angle estimate for each phase. The angle combination logic combines the phase angle estimates to obtain an absolute angle estimate which eliminates ambiguities that would otherwise be present. The estimator utilizes a model of the switched reluctance machine system as well as the absolute angle measurement to form a better estimate of the rotor position and velocity and, if necessary or desirable for other purposes, the rotor acceleration.

The simplest approach is to utilize the estimated rotor position developed by the Kalman filter to directly control commutation. However, the time required to estimate rotor position limits the number of position estimates that can be developed per electrical cycle by the Kalman filter, and hence an instantaneous position generation circuit is provided to convert the output of the Kalman filter to a signal that can properly control commutation.

An object of the present invention is to develop initial estimates of rotor position and velocity for the Kalman filter in the estimator. It is further an object to develop the estimates using circuitry which is simple, reliable and low in cost.

These and other objects and advantages are attained by an initialization circuit and method that may be implemented by hardware, software or a combination of both. During an initialization period, a plurality of pulses is provided to phase windings of the switched reluctance machine and a sequence of rotor position estimates is obtained from the angle combination circuit. The estimates are converted into a sequence of rotor position and velocity values. At an end of the initialization period, the last values in the succession of rotor position and velocity values are provided to the Kalman filter.

In accordance with the preferred embodiment, each velocity value is computed as an average of a plurality of instantaneous rotor velocity estimates. Each instantaneous rotor velocity estimate is, in turn, preferably calculated from successive estimates developed by the angle combination circuit. An initial number of instantaneous rotor velocity estimates are ignored so that initial pulsing effects do not undesirably affect the calculation of rotor average velocity. Further, a test is preferably imposed that determines whether the change in rotor position as indicated by successive estimates from the angle combination circuit is less than a maximum expected change. If this is found not to be the case, the most recent estimate received from the angle combination circuit is disregarded in calculating average rotor velocity.

The estimator initialization apparatus and method accomplish initialization of an estimator from position estimates for any type of switched reluctance motor drive or starter/generator system.

These and other objects, advantages and novel features of the present invention will become apparent to those skilled in the art from the drawings and following detailed description.

DESCRIPTION OF THE PREFERRED EMBODIMENTS

Figure 1:
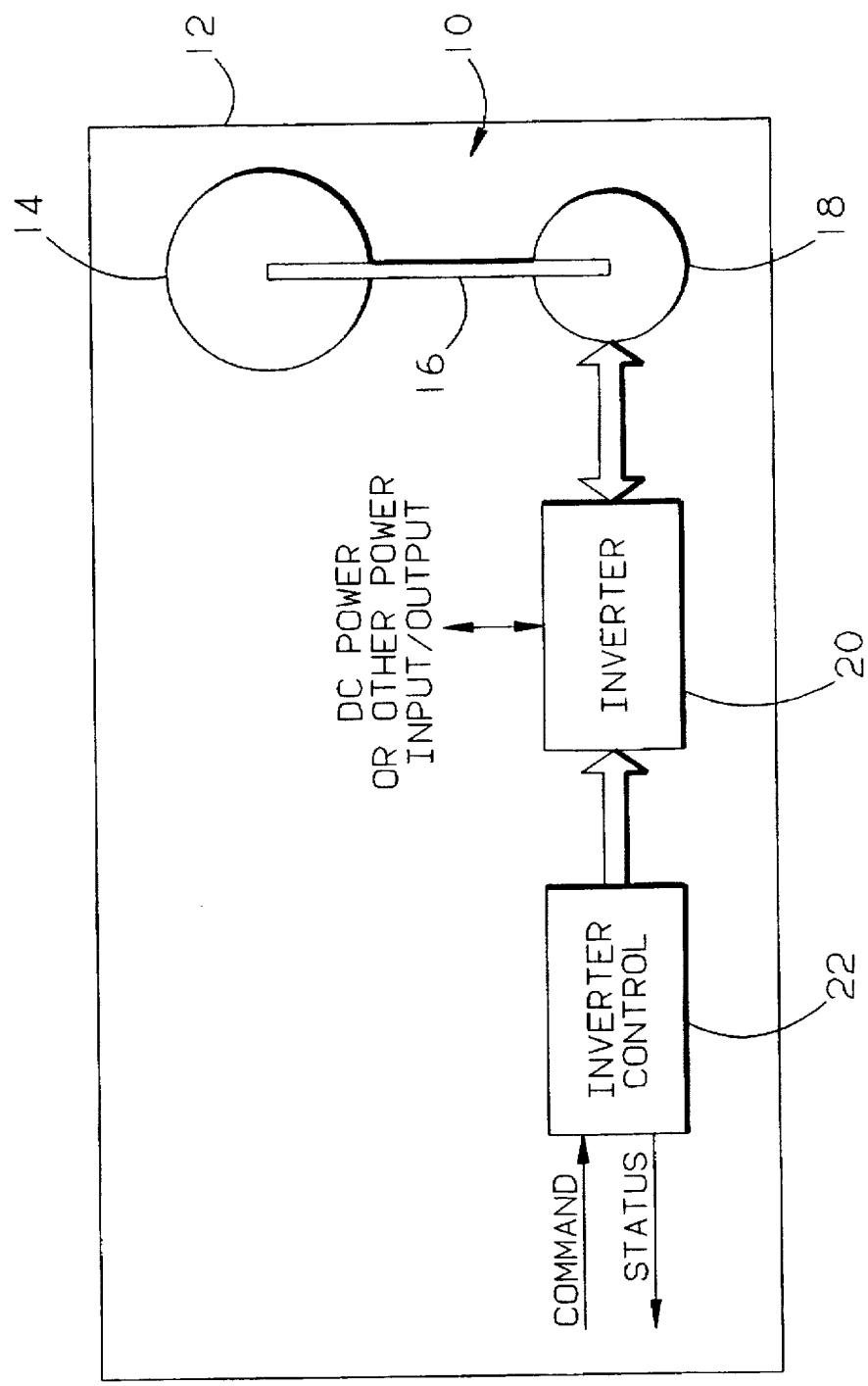
FIG. 1 comprises a block diagram of a starting/generating system for an aircraft.

Referring first to FIG. 1, a power conversion system 10 is provided on-board an aircraft (shown diagrammatically at 12) or other aerospace, land or water vehicle and includes a prime mover, for example, a gas turbine engine 14, which is coupled by a motive power shaft 16 to a switched reluctance machine 18. The machine 18 includes phase windings which are coupled to an inverter 20 operated by an inverter control 22. In a starting mode of operation, DC power is supplied to the inverter 20 and the inverter control 22 develops control signals for switches in the inverter 20 to cause the switched reluctance machine 18 to operate as a motor and supply motive power via the shaft 16 to the jet engine 14 for starting purposes. During operation in a generating mode, motive power is supplied by the gas turbine engine to the switched reluctance machine 18 via the shaft 16 and the resulting electrical power developed by the switched reluctance machine 18 is converted by the inverter 20 into DC power for one or more loads. If necessary or desirable, the inverter 20 could be modified to develop constant frequency AC power for one or more AC loads.

Figure 2:
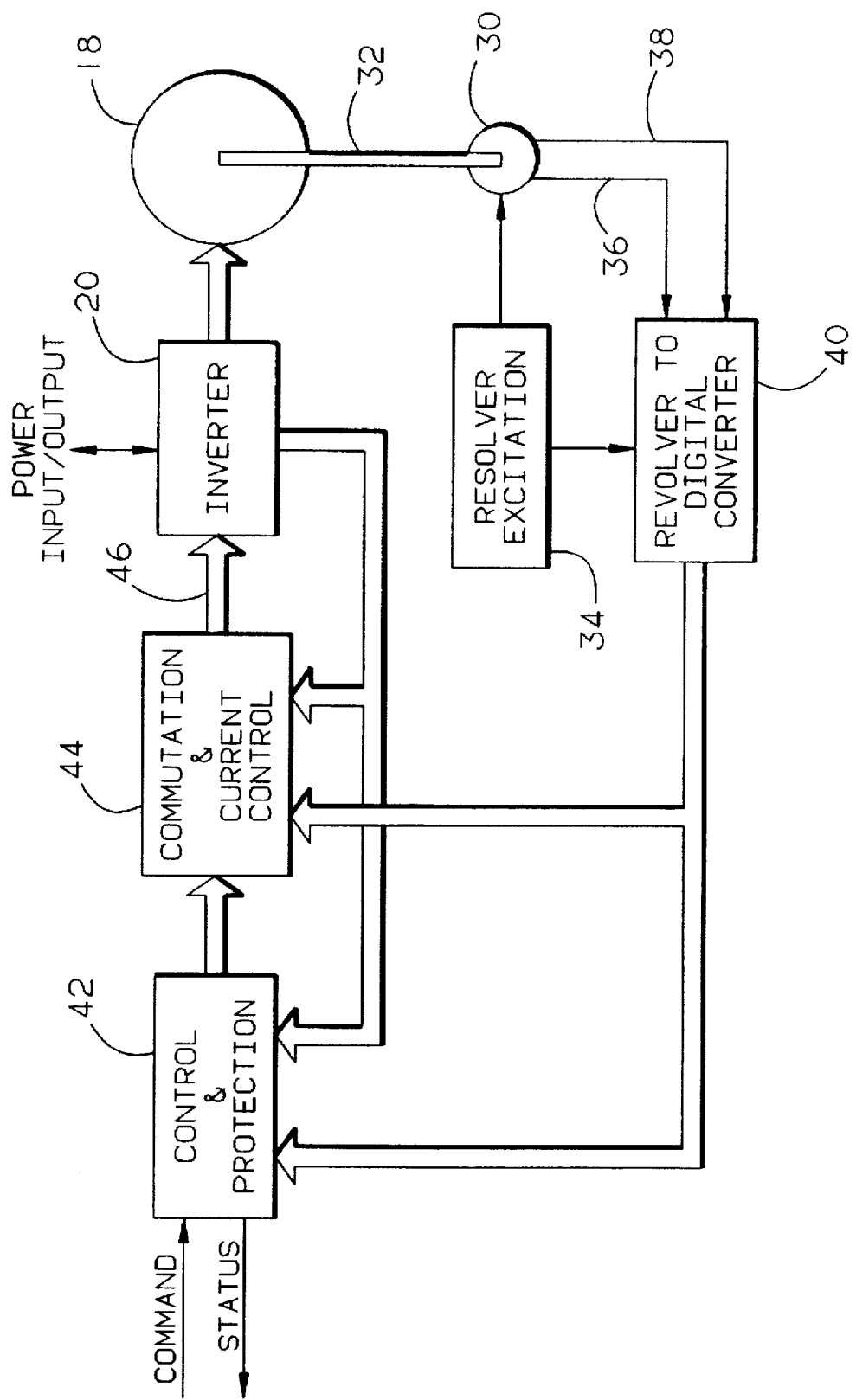
FIG. 2 comprises a block diagram of a prior art inverter control, inverter and switched reluctance machine.

Referring now to FIG. 2, a prior art inverter control for operating the switched reluctance machine 18 includes a resolver 30, which is coupled by a motive power shaft 32 to the rotor of the switched reluctance machine 18. Excitation is provided by a resolver excitation circuit 34. The resolver 30 develops first and second signals over lines 36, 38 that have a phase quadrature relationship (also referred to as sine and cosine signals). A resolver-to-digital converter 40 is responsive to the magnitudes of the signals on the lines 36 and 38 and develops a digital output representing the position of the rotor of the switched reluctance machine 18. The position signals are supplied along with a signal representing machine rotor velocity to a control and protection circuit 42. The rotor position signals are also supplied to a commutation and current control circuit 44 having an input coupled to an output of the control and protection circuit 42.

The circuits 42 and 44 further receive phase current magnitude signals as developed by the inverter 20. The circuits 42 and 44 develop switch drive signals on lines 46 for the inverter 20 so that the phase currents flowing in the windings of the switched reluctance machine 18 are properly commutated.

As noted previously, the resolver 30 is expensive and inherently a source of single point failure. Further, the resolver-to-digital converter 40 is also an expensive component and, hence, it is desirable to eliminate these and other components (including the excitation circuit 34), if possible.

Figure 3:
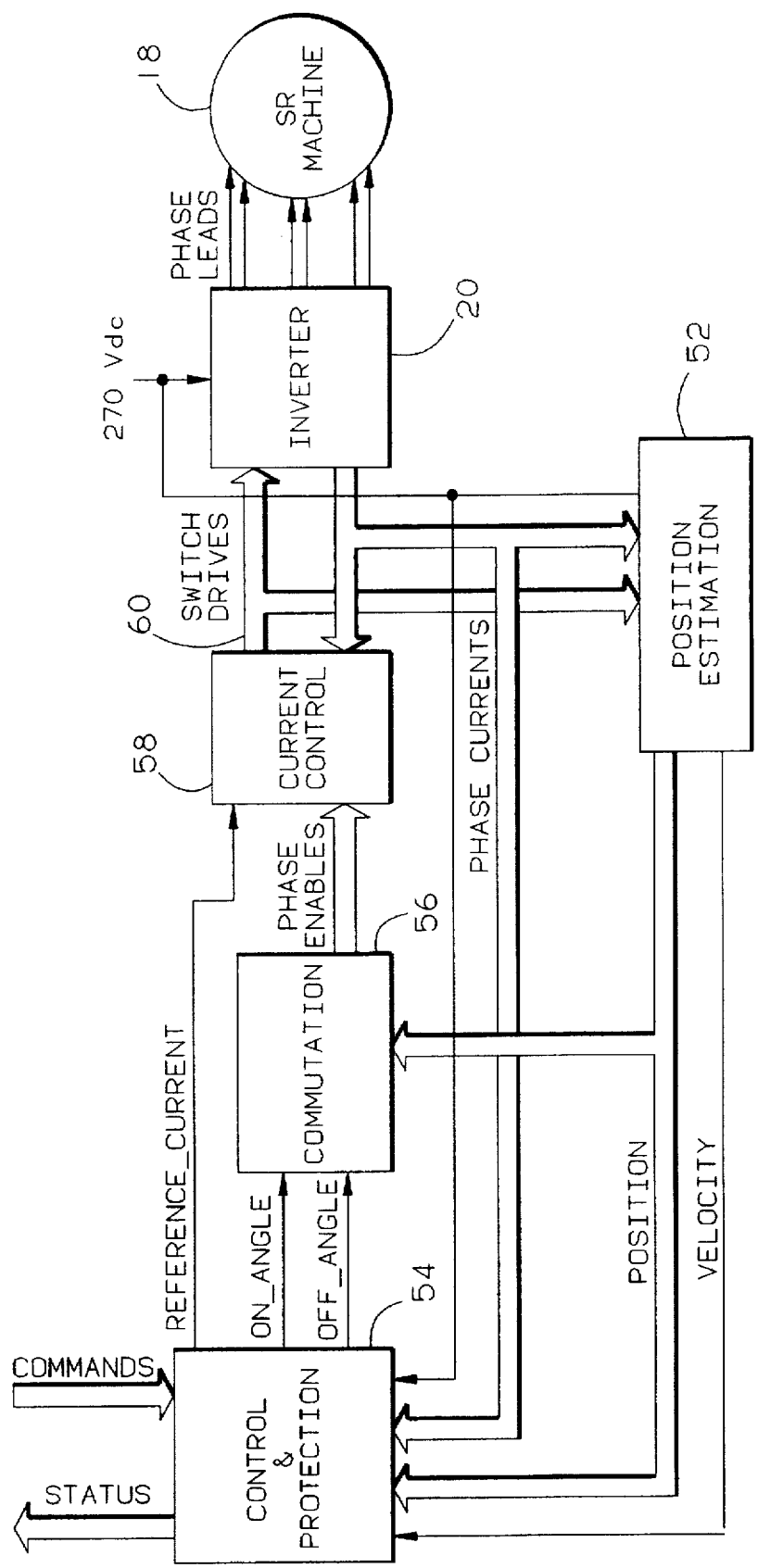
FIG. 3 comprises a block diagram of an inverter control incorporating the present invention together with an inverter and a switched reluctance machine.

FIG. 3 illustrates an inverter control 50 that incorporates the present invention together with the inverter 20 and the switched reluctance machine 18. A position estimation circuit 52 is responsive to the phase current magnitudes developed by the inverter 20, switch control or drive signals for switches in the inverter 20 and DC bus voltage magnitude to develop position and velocity estimate signals for a control and protection circuit 54. In addition, the position estimate signals are supplied to a commutation circuit 56. A current control circuit 58 is responsive to the phase current magnitudes developed by the inverter 20, as well as phase enable output signals developed by the commutation circuit 56 and a reference current signal developed by the control and protection circuit 54. The current control circuit 58 produces the switch control or drive signals on lines 60 for the inverter 20.

Figure 4:
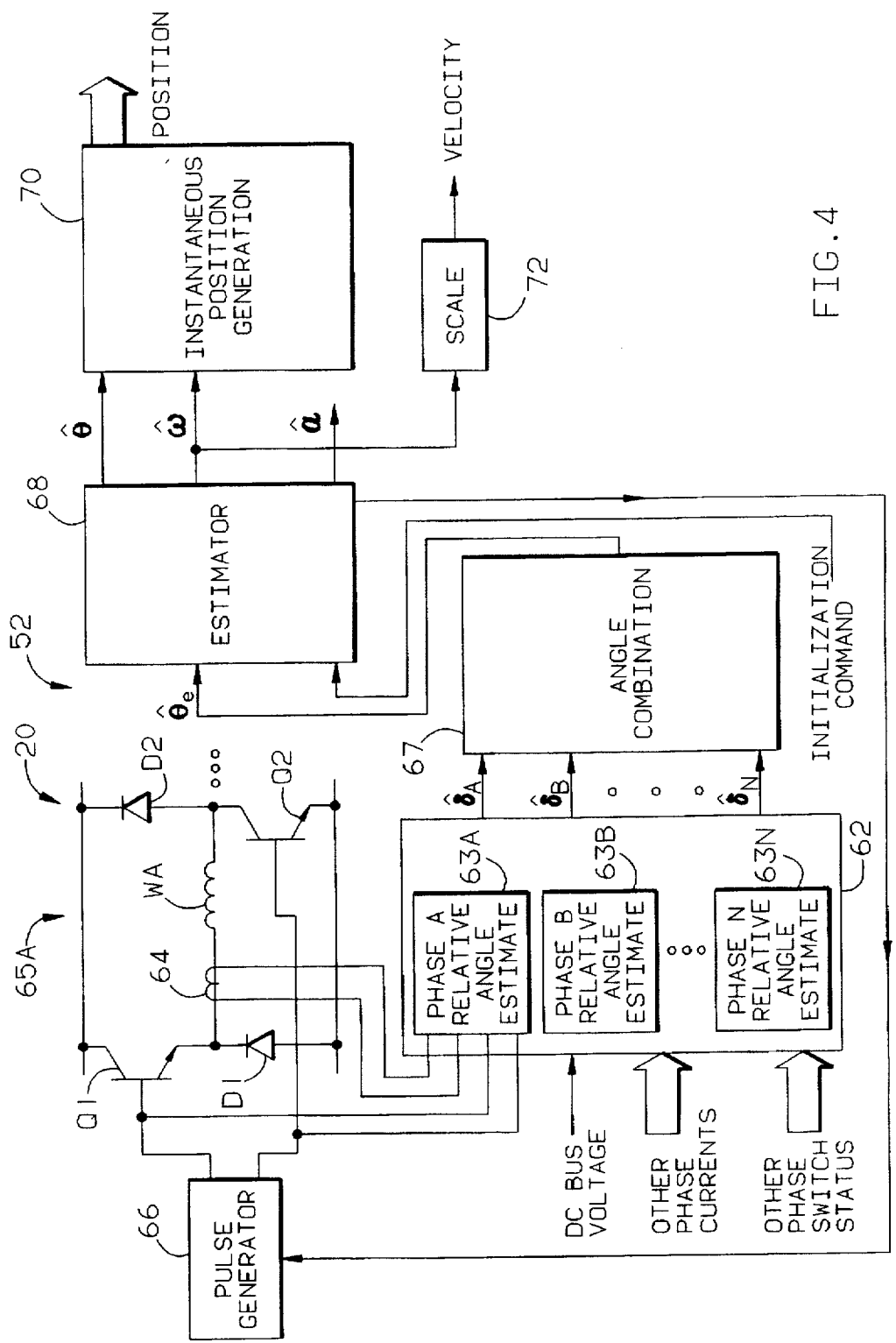
FIG. 4 comprises a block diagram of a portion of the inverter of FIG. 3 together with the position estimation circuit of FIG. 3.

FIG. 4 illustrates the position estimation circuit 52 in greater detail. A relative angle estimation logic circuit 62 includes N individual phase relative angle estimate circuits 63A, 63B, . . . 63N, each of which is associated with one of the N phases of the switched reluctance machine 18. Specifically, the phase relative angle estimate circuit 63A is associated with phase A of the machine 18 and receives a current magnitude signal developed by a current sensor 64 adapted to sense the current flowing in a phase A winding WA of the machine 18. The winding WA is connected in a phase A leg 65A of the inverter 20 having a pair of diodes D1 and D2 and a pair of controllable power switches Q1 and Q2. During initialization, the switches Q1 and Q2 receive switch control signals CS1 and CS2 (FIG. 6) from a pulse generator 66, and thereafter receive the control signals on the lines 60 from the current control circuit 58 of FIG. 3. Furthermore, during initialization, the phase relative angle estimate circuit 63A also receives the switch control signals CS1 and CS2 and thereafter receives the control signals on the lines 60 from the circuit 58. During initialization, and subsequently, during operation of the circuitry of FIGS. 3 and 4 to control the machine 18, the circuit 63A develops a signal $_\delta A$ representing A an estimate of instantaneous angle from rotor/stator alignment for phase A of the machine. Similarly, each of the remaining phase relative angle estimate circuits 63B, . . . ,63N is responsive to an associated phase current magnitude signal and is further responsive to switch control signals either identical to the signals CS1 and CS2 (during initialization) or control signals developed by the circuit 58 (after initialization) for switches in the associated inverter phase. Each circuit 63B, . . . , 63N develops a signal $_\delta B$, . . . $_\delta N$, respectively, representing an estimate of instantaneous angle from rotor/stator alignment for the associated phase of the machine, both during initialization and thereafter.

Each angle estimate signal $_\delta A$, $_\delta B$, . . . $_\delta N$, represents two possible solutions for estimated rotor position, either phase advanced with respect to (i.e., moving toward) the respective phase pole or phase delayed with respect to (i.e., moving away from) the respective phase pole This ambiguity is removed by an angle combination circuit 67 which combines the signals $_\delta A$, $_\delta B$, . . . $_\delta N$, to obtain an absolute angle estimate $_\delta e$. The angle estimate $_\theta A_e$ is provided to an estimator 68, preferably including a Kalman filter, which improves the estimate of rotor position to obtain a value $_\delta$. In addition, the estimator 68 develops a velocity estimate $_\tilde{\omega}$ and further develops an estimated acceleration signal $_\tilde{\alpha}$ representing the estimated acceleration of the machine rotor. The acceleration signal A may be used by other circuits (not shown). The signals $_\delta$ and $_\tilde{\omega}$ are supplied to an instantaneous position generation circuit 70 which converts the coarse sampled output of the Kalman filter into a signal having position update intervals which are sufficiently fine to properly control commutation.

The signal $_\tilde{\omega}$ is further supplied to a scaling circuit 72, which in turn develops a velocity estimate signal in the correct units (e.g., rpm's) for the control and protection circuit 54 of FIG. 3.

The estimator 68 further receives an initialization command signal and develops a trigger signal for the pulse generator 66 in the fashion noted in greater detail hereinafter.

Figure 5A:
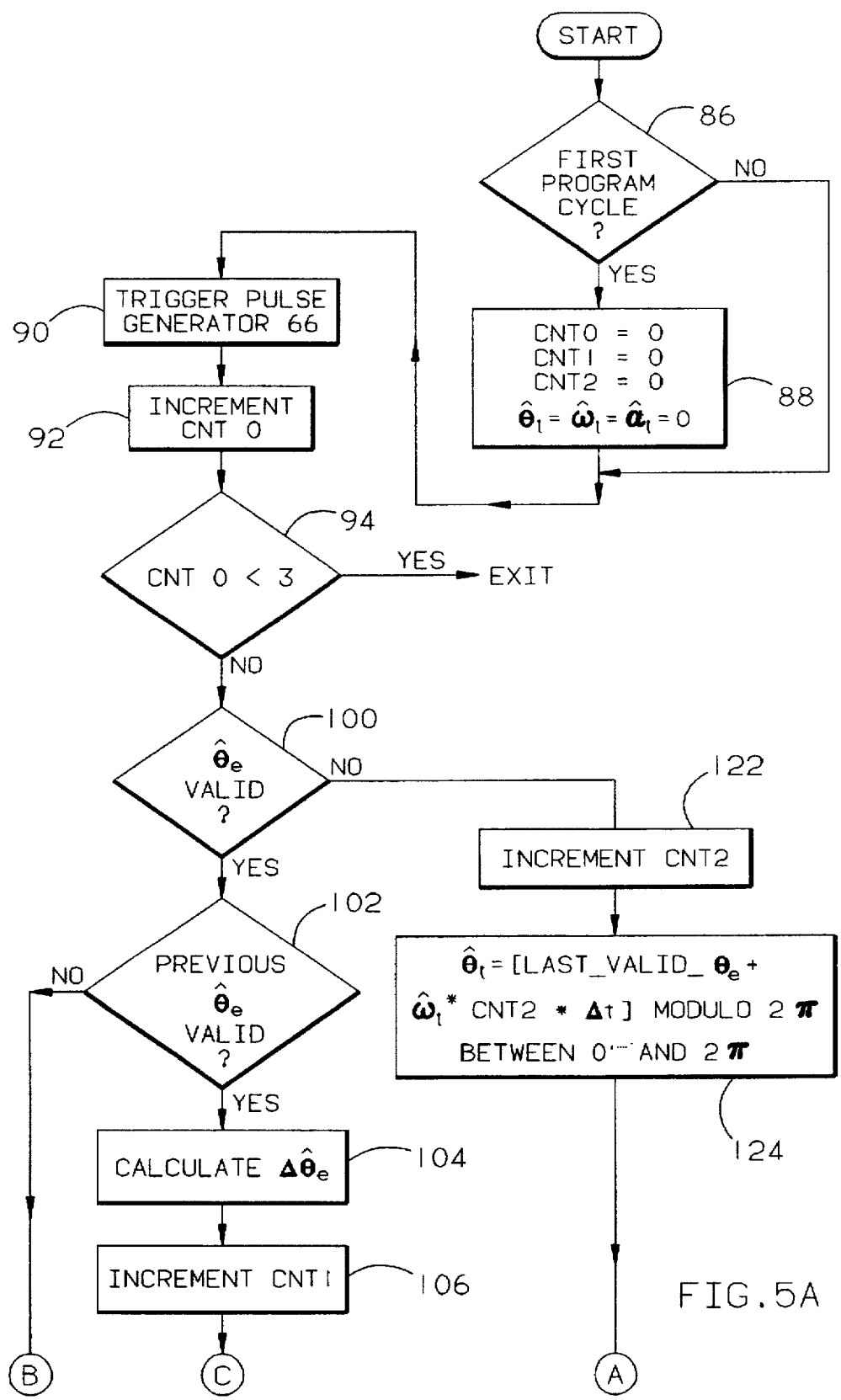
FIGS. 5A and 5B, when joined at the similarly lettered lines, together comprise a flowchart illustrating programming for implementing the circuit of the present invention.
Figure 5B:
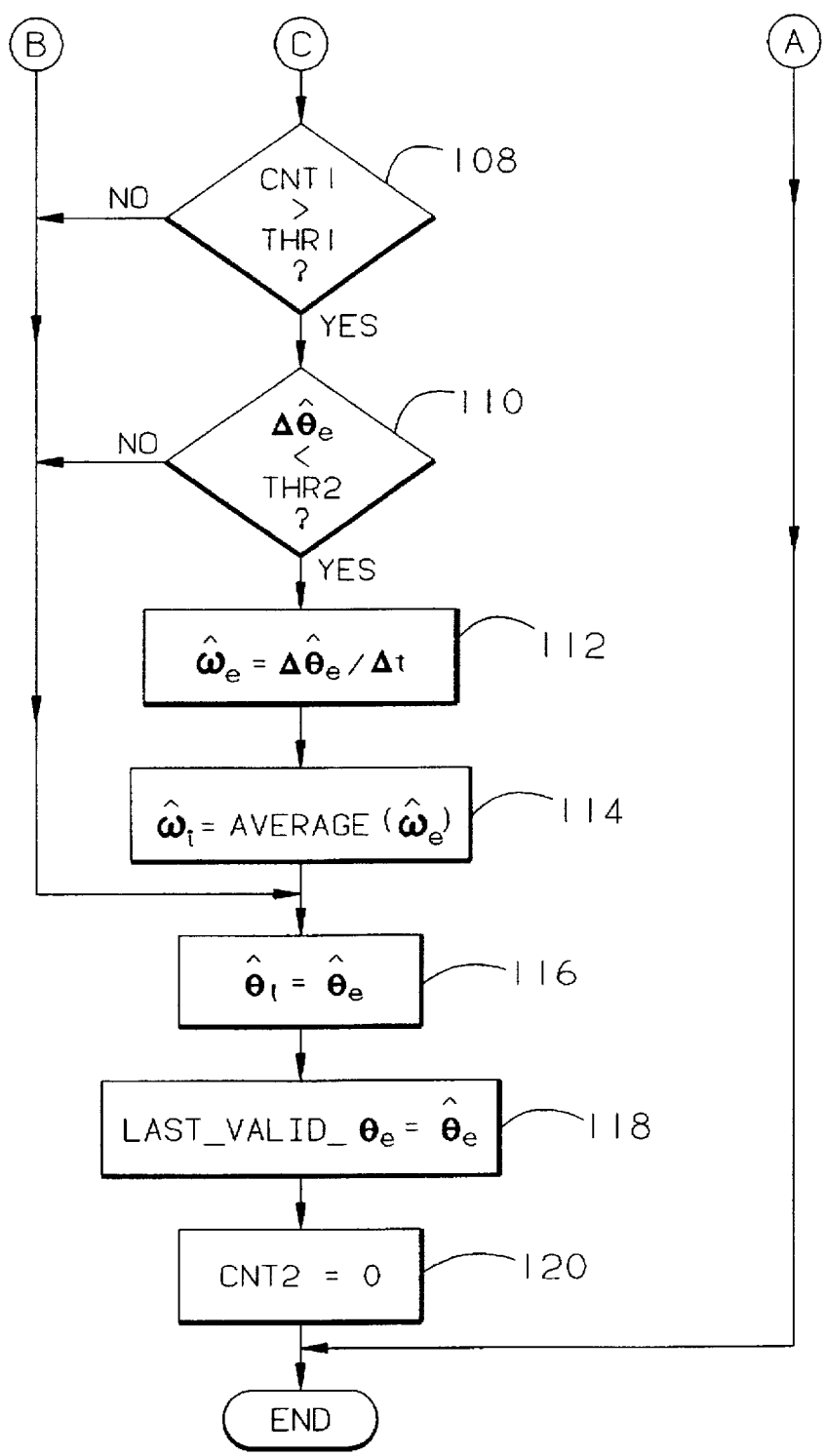

FIGS. 5A and 5B illustrate a portion of the operation of the estimator 68 in flowchart form. In the preferred embodiment, the estimator 68, as well as the relative angle estimation circuit 62, the angle combination circuit 67, the instantaneous position generation circuit 70 and the scaling circuit 72 of FIG. 4 may be implemented by a suitably programmed digital signal processor (DSP). Alternatively, any of these circuits may be implemented by different circuitry, for example, discrete logic circuits or other hardware, or may be implemented by a combination of hardware and software, as desired.

The programming illustrated in FIGS. 5A and 5B is executed once per program cycle and is repeated a particular number of times (e.g., 100) to develop initial condition values $_{\theta i}$), and $_{\tilde{\omega} i}$ representing initial machine rotor position and initial machine rotor speed, respectively, for the Kalman filter of the estimator 68. In addition, an initial condition is established for the Kalman filter indicating zero acceleration of the rotor of the machine 18 by the DSP.

Figure 6:
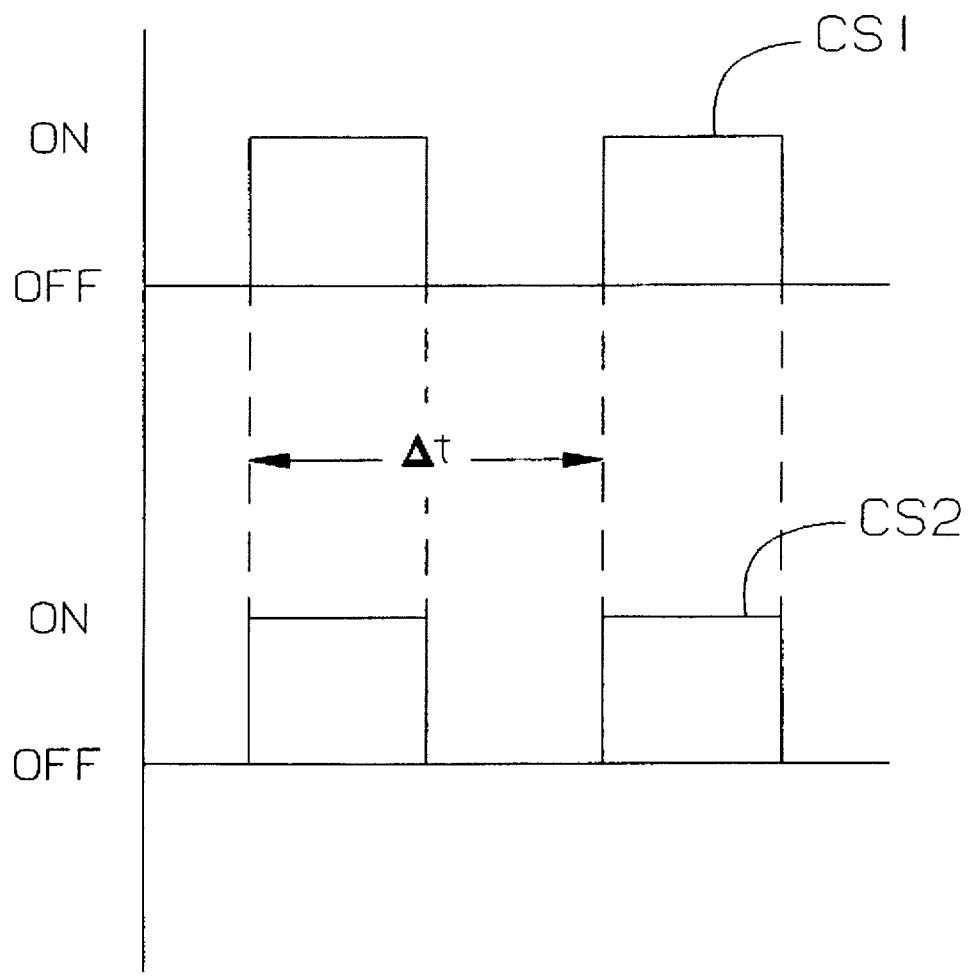
FIG. 6 comprises waveform diagrams of control signals for the switches of the inverter of FIG. 4.

The programming of FIGS. 5A and 5B automatically begins upon startup of the system including the position estimation circuit 52, at which point an initialization period is begun. Alternatively, the programming of FIGS. 5A and 5B may be invoked when estimator lock is lost, (i.e., where the estimator has lost synchronism with actual machine operating conditions) or when initialization is otherwise commanded by the initialization command signal. During the initialization period, the pulse generator 66 develops and provides the control signals CS1 and CS2 to the switches Q1 and Q2. Control signals identical to the signals CS1 and CS2 are simultaneously provided to the switches in the remaining phases of the inverter 20. As seen in FIG. 6, the control signals including the signals CS1 and CS2 repetitively turn on and turn off all of the switches in the inverter 20 a certain number of times (preferably 100) during the initialization period. The inverter switches are operated together such that they are rendered conductive at the same time and are turned off at the same time, with a period equal to Δt. The widths of the pulses in CS1 and CS2 are such that the phase current magnitude does not become excessive and such that the phase current magnitude decays to zero before application of the next pulse. During the initialization period, the estimator 68 analyzes the samples or estimates $_{\delta e}$ from the angle combination circuit 67 to derive the initial values.

With specific reference to FIG. 5A, the programming begins at a block 86, which checks to determine whether the current pass through the programming of FIGS. 5A and 5B is the first since the initialization period was begun. If so, a block 88 sets various values and counters equal to zero. A block 90 then triggers the pulse generator 66 so that each phase winding of the machine 18 receives a single current pulse and a block 92 increments a pulse counter CNT0. Thereafter, a block 94 checks to determine whether the output of the counter CNT0 indicates that each phase winding has been pulsed at least three times since the beginning of the initialization period. If not, control exits the programming of FIGS. 5A and 5B to other programming executed by the estimator 68 for the balance of the current program cycle. Alternatively, if the output of the counter CNT0 is equal to or greater than three, control passes to a block 100.

The block 100 obtains the current value of the angle estimate $_{\delta e}$ from the angle combination circuit 67 and checks to determine whether the value is a valid estimate. This is determined by checking to determine whether $_{\delta e}$ is within an expected range of values. If the current estimate $_{\delta e}$ is valid and a block 102 determines that the immediately preceding estimate $_{\delta e}$ was likewise valid using the same validity testing criterion, a block 104 calculates a value $\Delta_\delta$ which is equal to the difference between the current and immediately preceding estimates developed by the circuit 67. A block 106 then increments a counter CNT1 which indicates the number of valid estimates developed by the circuit 67 since the beginning of the initialization period.

Following the block 106, a block 108 (FIG. 5B) checks to determine whether the contents of the counter CNT1 exceeds a certain threshold THR1. In the preferred embodiment, the value of THR1 is set equal to ten so that the first ten valid instantaneous velocity estimates developed by the programming of FIGS. 5A and 5B are ignored owing to the possibility of rotor pulsing effects, such as jerk, when a low inertia rotor and load are first pulsed by currents resulting from application of the control signals. If the contents of the counter CNT1 exceed THR1, a block 110 checks to determine whether the value of $\Delta_{\theta_e}$ is less than a second threshold value THR2. The second threshold THR2 establishes a maximum expected change in $\theta_e$ from one estimate to the next, and, in the preferred embodiment, is set equal to $\pi$ radians.

If the block 110 determines that the value of $\Delta_{\theta_e}$ is less than the threshold THR2., a block 112 calculates a value $\hat{\omega}_e$ equal to $\Delta_{\tau_a}/\Delta t$, where $\Delta t$ is the period of the control signals, as noted previously. The block 112 thus develops an instantaneous velocity estimate $\hat{\omega}_e$ for the rotor of the machine 18. Following the block 112, a block 114 calculates the value $\hat{\omega}_i$ representing the estimated rotor speed as an average of all of the instantaneous speed estimates $\hat{\omega}_e$.

A block 116 then establishes the value of the initial position estimate $\theta_i$ equal to the current value of $\theta_e$. Thereafter, a block 118 establishes the value of a variable LAST_VALID_$\theta_\theta$ also equal to the current value of $\theta_e$. A block 120 then clears a counter CNT2 and control passes to other programming of the estimator 68 for the balance of the program cycle.

If the block 102 determines that the previous position estimate $\theta_e$ was not valid, then there is no way to calculate the change in rotor position nor can the velocity be updated. Consequently, in this event, control passes to the block 116 from the bock 102, thereby skipping the blocks 104–114. Control also passes directly to the block 116 if the block 108 determines that the value of the counter CNT1 is not greater than the threshold THR1 or if the block 110 determines that the value of $\Delta_{\theta_e}$ is not less than the threshold THR2, thereby skipping the blocks 112 and 114.

If the block 100 determines that the current position estimate $\theta_e$ not valid, a block 122 increments the counter CNT2 and a block 124 calculates a value for $\theta_i$ according to the following equation:

$$\theta_i = (LAST\_VALID\_ + \omega_i \times CNT2 \times \Delta t) \text{ modulo } 2\pi \text{ between } 0 \text{ and } 2\pi.$$

Control from the block 124 then exits the programming of FIGS. 5A and 5B to other programming executed by the estimator 68 for the balance of the program cycle.

As should be evident from the flowchart of FIGS. 5A and 5B, if a value of $\theta_e$ from the angle combination circuit 67 is found to be invalid, then a position estimate is obtained from the sum of the last valid reading of $\theta_e$ incremented by a rotor position change value determined from the product of the average velocity and the time since the last reading of $\theta_e$ was validly developed.

Generally, in order to accurately estimate rotor position, the sensing pulses in the control signals must occur at a repetition rate sufficient to ensure that at least two pulses occur during each electrical cycle of the machine 18 so that aliasing effects are eliminated. As a result, the value $\Delta_{\theta_e}$ representing the change in rotor position cannot exceed $\pi$. As a consequence of this requirement, there is a minimum pulse repetition rate for the signals CS1 and CS2 which is determined by the highest expected rotor velocity.

It should be noted that the block 104 calculates $\Delta\hat{\theta}_e$ using a function modulo $2\pi$ such that a value (in radians) is developed in a range between $-\pi$ and $+\pi$.

Once the programming of FIGS. 5A and 5B has been executed the desired number of times, the windings of the machine 18 will have been pulsed a like number of times to obtain the position and velocity initial values $\theta_i$ and $\hat{\omega}_i$. These values are then supplied to the Kalman filter in the estimator 68.

It should be noted that the Kalman filter in the estimator 68 continues to operate during initialization; however, the output of the Kalman filter is overwritten during this time and not used.

It should further be noted that the initialization period must be kept small enough so that the velocity change during maximum acceleration is not significant.

It should also be noted that if the initialization process is attempted more than a threshold number of times in a defined period then it can be assumed that initialization cannot be successfully completed. In this situation, a system error message is generated and appropriate action taken, such as system shut down.

The estimator initialization process illustrated in FIG. 5 is valid for initializing an estimator for any type of motor drive or starter/generator system.

Numerous modifications and alterative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. Apparatus for developing an initial estimate of a condition of a machine having a plurality of phase windings each coupled to a power converter, wherein a first circuit is coupled to the phase windings for developing a plurality of phase relative angle estimates and a second circuit is coupled to the first circuit and combines the plurality of phase relative angle estimates into a single estimate, comprising:

means for pulsing the phase windings during an initialization period such that the second circuit develops a sequence of phase relative angle estimates; and means coupled to the second circuit for deriving the initial estimate of the machine condition from the sequence of phase relative angle estimates.

2. The apparatus of claim 1, wherein the deriving means comprises means for determining whether each phase relative angle estimate is valid and means for obtaining a sequence of machine rotor position estimates from valid phase relative angle estimates.

3. The apparatus of claim 2, wherein the deriving means includes means for calculating a sequence of machine rotor velocity estimates from the sequence of machine rotor position estimates.

4. The apparatus of claim 3, wherein the deriving means further includes means for averaging the sequence of machine rotor velocity estimates to obtain an initial estimate of machine rotor velocity.

5. The apparatus of claim 2, wherein the deriving means further includes means for disregarding a number of phase relative angle estimates.

6. The apparatus of claim 1, wherein the pulsing means is operable a certain number of times during the initialization period.

7. In a sensorless control for a switched reluctance machine having a plurality of phase windings each coupled to a power converter, a first circuit coupled to the phase windings for developing a plurality of phase relative angle estimates, a second circuit for combining the plurality of phase relative angle estimates into a single estimate, apparatus for developing an initial estimate of a machine condition, comprising:

means for pulsing the phase windings during an initialization period such that the second circuit develops a sequence of phase relative angle estimates; and means coupled to the second circuit for deriving the initial estimate of the machine condition from the sequence of phase relative angle estimates.

8. The apparatus of claim 7, wherein the deriving means comprises means for determining whether each phase relative angle estimate is valid and means for obtaining a sequence of machine rotor position estimates from valid phase relative angle estimates.

9. The apparatus of claim 8, wherein the deriving means includes means for calculating a sequence of machine rotor velocity estimates from the sequence of machine rotor position estimates.

10. The apparatus of claim 9, wherein the deriving means further includes means for averaging the sequence of machine rotor velocity estimates to obtain an initial estimate of machine rotor velocity.

11. The apparatus of claim 8, wherein the deriving means further includes means for disregarding a number of phase relative angle estimates.

12. The apparatus of claim 7, wherein the pulsing means is operable to provide a certain number of pulses to each phase winding during the initialization period.

13. A method of developing an initial estimate of a condition of a machine having a plurality of phase windings each coupled to a power converter, wherein a first circuit is coupled to the phase windings for developing a plurality of phase relative angle estimates and a second circuit is coupled to the first circuit and combines the plurality of phase relative angle estimates into a single estimate, the method comprising the steps of:

providing a number of pulses to the phase windings during an initialization period such that the second circuit develops a sequence of phase relative angle estimates; and deriving the initial estimate of the machine condition from the sequence of phase relative angle estimates.

14. The method of claim 13, wherein the step of deriving includes the steps of determining whether each phase relative angle estimate is valid and obtaining a sequence of machine rotor position estimates from valid phase relative angle estimates.

15. The method of claim 14, wherein the step of deriving includes the step of calculating a sequence of machine rotor velocity estimates from the sequence of machine rotor position estimates.

16. The method of claim 15, wherein the step of deriving further 2 includes the step of averaging the sequence of machine rotor velocity estimates to obtain an initial estimate of machine rotor velocity.

* * * * *